United States Patent
Doenges et al.

(10) Patent No.: US 6,515,049 B1
(45) Date of Patent: *Feb. 4, 2003

(54) WATER-SOLUBLE, SULFOALKYL-CONTAINING, HYDROPHOBICALLY MODIFIED CELLULOSE ETHERS, PROCESS FOR PREPARING THEM, AND THEIR USE AS PROTECTIVE COLLOIDS IN POLYMERIZATIONS

(75) Inventors: Reinhard Doenges, Bad Soden; Horst Wurm, Wiesbaden, both of (DE)

(73) Assignee: Clariant GmbH, Frankfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/427,350

(22) Filed: Oct. 26, 1999

(30) Foreign Application Priority Data

Oct. 27, 1998 (DE) .......................... 198 49 441

(51) Int. Cl.⁷ ........................... C08B 5/14; C08B 11/02; C08B 11/08; C08B 11/10; C08B 11/193
(52) U.S. Cl. ........................... 524/36; 524/35; 524/42; 524/43; 524/44; 524/46; 524/457
(58) Field of Search .......................... 524/35, 36, 42, 524/43, 44, 46, 457

(56) References Cited

U.S. PATENT DOCUMENTS

| | | | | |
|---|---|---|---|---|
| 4,228,277 A | * | 10/1980 | Landoll | ........................ 536/90 |
| 4,376,177 A | * | 3/1983 | Matsunaga et al. | ........... 524/35 |
| 4,845,175 A | | 7/1989 | Lo | |
| 4,868,238 A | | 9/1989 | Craig | |
| 5,278,304 A | * | 1/1994 | Kniewske et al. | ............. 536/90 |
| 5,358,561 A | | 10/1994 | Kiesewetter et al. | |
| 5,591,844 A | | 1/1997 | Bartz et al. | |
| 5,708,162 A | | 1/1998 | Hilbig et al. | |
| 5,891,450 A | | 4/1999 | Miyajime et al. | |
| 6,087,457 A | * | 7/2000 | Tsai | ............................. 526/72 |
| 6,313,287 B1 | | 11/2001 | Doengas et al. | |

FOREIGN PATENT DOCUMENTS

| | | | |
|---|---|---|---|
| DE | 198 49 441 | 5/2000 | |
| EP | 0 307 915 | 3/1989 | |
| EP | 0 511 540 | 11/1992 | |
| EP | 0 554 751 | 8/1993 | |
| EP | 0 573 852 | 12/1993 | |
| EP | 0 781 780 | 7/1997 | |
| EP | 781780 A * | 7/1997 | ......... C08B/11/193 |

OTHER PUBLICATIONS

Derwent Abstract of DE 198 49 441 5/00.
P. Talaba, New Alkylated O–(2–Sulfoethyl) Cellulose and Its Properties, Chem. Papers 50(2), pp. 101–104, 1996.
Ellis Horwood, Cellulose and Its Derivatives, Chapter 26, 1985.
T.M. Greenway, Cellulose Polymers, Blends and Composites, Chapter 9, 1994.

* cited by examiner

Primary Examiner—David W. Wu
Assistant Examiner—K C Egwim
(74) Attorney, Agent, or Firm—Anthony A. Biscula

(57) ABSTRACT

The present invention relates to water-soluble ionic cellulose ethers from the group of the hydroxyalkylcelluloses which are substituted by on average from 0.001 to 1.0 alkyl group per anhydroglucose unit and which carry from 0.01 to 0.1 sulfoalkyl group per anhydroglucose unit, to processes for preparing them and to the use of water-soluble ionic cellulose ethers from the group of the hydroxyalkylcelluloses which are substituted by on average from 0.001 to 1.0 alkyl group per anhydroglucose unit and which carry from 0.01 to 0.4 sulfoalkyl group per anhydroglucose unit as protective colloids in polymerizations.

2 Claims, No Drawings

WATER-SOLUBLE, SULFOALKYL-CONTAINING, HYDROPHOBICALLY MODIFIED CELLULOSE ETHERS, PROCESS FOR PREPARING THEM, AND THEIR USE AS PROTECTIVE COLLOIDS IN POLYMERIZATIONS

CROSS-REFERENCE TO RELATED APPLICATION

The present invention is described in the German priority application No. 19849441.6 filed Oct. 27, 1998 which is hereby incorporated by reference as is fully disclosed herein.

BACKGROUND OF THE INVENTION

The present invention relates to water-soluble, sulfoalkyl-containing, hydrophobically modified cellulose ethers, to processes for preparing them and to their use as protective colloids in polymerizations.

The preparation of vinyl polymers by free-radical polymerization in an aqueous, solvent-free medium makes it necessary to emulsify the hydrophobic monomers and, after polymerization is complete, to stabilize the polymer. For this reason, the polymerization of monomer systems comprising water-insoluble vinyl monomers in aqueous systems requires not only surfactants but also protective colloids which, on the one hand, have hydrophilic character and, on the other hand, should also have a dispersing action.

The quality of a polymer dispersion is decisively influenced by the choice of the protective colloid. Important quality criteria which can be influenced by the protective colloids are, for example, the stability, viscosity, rheology, the particle size of the polymer particles of the dispersion, and also the amount of coagulum which remains on filtering the dispersion through a sieve. The molecular weight is also influenced by the protective colloid. A further quality criterion is the water absorption of a film which has been produced by spreading and drying a dispersion. This property too is influenced by the protective colloid. In suspension polymerization, the protective colloid controls the particle size of the polymer formed.

It has been known for a long time that polymeric carbohydrates such as starch, dextrans and water-soluble cellulose derivatives are suitable protective colloids for water-based polymerization systems. The protective colloid used most frequently in the commercial production of polyvinyl acetate dispersions is hydroxyethylcellulose (Cellulose and its Derivatives, chapter 26, Ellis Horwood Limited 1985), which is produced on an industrial scale from cellulose and ethylene oxide.

The decisive process in the use of protective colloids in emulsion polymerization is regarded as being free-radical formation on the protective colloid and subsequent grafting of the monomer onto the colloid. The degree of grafting depends on the choice of free-radical initiator. Free-radical initiators customarily used are diazo compounds, redox initiators, organic and inorganic peroxo compounds. On the other hand, the degree of grafting also depends on the nature of the protective colloid. If the degree of grafting is low, the chosen concentration of the protective colloid must be appropriately high in order to achieve a sufficient effect. However, a high protective colloid concentration is undesirable, on the one hand, for cost reasons and, on the other hand, it also leads to increased hydrophilicity of the filmed polymer, in conjunction with increased water absorption.

DESCRIPTION OF THE RELATED ART

In U.S. Pat. No. 4,845,175 it is shown that the use of hydroxyethylcellulose which has been hydrophobically modified with arylalkyl groups enables the amount of protective colloid to be produced. Hydrophobically modified cellulose ethers, however, possess a reduced solubility in water.

U.S. Pat. No. 4,868,238 describes carboxymethyl-bearing, hydrophobically modified cellulose ethers as protective colloids in suspension polymerization. Carboxymethyl groups, however, are sensitive to polyvalent cations as are used as electrolytes.

P. Talaba, I. Srokova, P. Hodul and G. Cik in Chem. Papers 50 (2), 101 (1996) describe hydrophobically modified sulfoethylcelluloses. High degrees of substitution are necessary in these compounds, however, because of the absence of other substituents. They are water-soluble only at low degrees of polymerization, and possess a strong tendency to form foam, which is undesirable for use in emulsion paints. EP-A-0 781 780 describes sulfoalkylated cellulose ethers modified hydrophobically using $C_{10}$–$C_{40}$ alkyl chains, these ethers likewise possessing a high surfactant action and being used as thickeners in cosmetic formulations. For these compounds a degree of sulfoalkylation of from 0.1 to 1 is claimed.

SUMMARY OF THE INVENTION

The object of the present invention was therefore to develop new kinds of protective colloids for polymerizations in aqueous systems, which ensure the same or better quality of the polymer dispersions or polymer suspensions prepared, with a reduction in the amount used and with good processing properties.

It has been found, surprisingly, that hydrophobically substituted sulfoalkyl-HECs are outstandingly suitable as a protective colloid in emulsion polymerization if the degree of substitution in terms of hydrophobic alkyl groups is greater than or equal to 0.001 but does not exceed 1.0, preferably 0.2, alkyl groups per monomer unit. When protective colloids of this kind are used, the amount required is substantially lower than in the case of conventional HEC protective colloids.

DESCRIPTION OF THE PREFERRED EMBODIMENTS

The invention accordingly provides water-soluble ionic cellulose ethers from the group of hydroxyalkylcelluloses which are substituted by on average from 0.001 to 1.0, preferably from 0.001 to 0.2, alkyl group per anhydroglucose unit and carry from 0.01 to 0.1 sulfoalkyl group per anhydroglucose unit.

Preferred cellulose ethers are those of the formula $$[C_6H_7O_2(OR^1)(OR^2)(OR^3)]_m$$

where $C_6H_7O_2$ is an anhydroglucose unit,
m is 50–3000, especially 100–1000,
and $R^1$, $R^2$, $R^3$ independently of one another are each a polyalkylene oxide chain of the formula

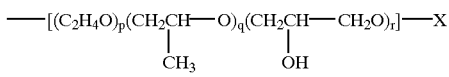

where X=H, $C_nH_{2n+1}$, $C_nH_{2n+1}O$, $CH_2$—$CH_2$—$SO_3Y$ or $CH_2$—$CHOH$—$CH_2SO_3Y$,
n=4–20
and Y=H, Na or K,
and in which
p, q, and r independently of one another in $R^1$, $R^2$ and $R^3$ can each independently assume values from 0 to 4, the sum of all (p+q+r) added over $R^1$, $R^2$ and $R^3$ per anhydroglucose unit is on average greater than 1.3 and less than 4.5, preferably from 1.5 to 3.0, the sequence of the oxyalkylene units in the polyalkylene oxide chain is arbitrary, and the average number of hydrophobically modified groups per 10 anhydroglucose unit (DS HM) is from 0.001 to 0.2, preferably from 0.01 to 0.04, and the average number of sulfoalkyl groups per anhydroglucose unit is from 0.01 to 0.1, preferably from 0.01 to 0.09. The sulfoalkyl groups are preferably sulfoethyl groups.

The present invention also provides processes for preparing the cellulose ethers of the invention by etherifying cellulose with an etherifying agent from the group of the alkylene oxides and etherifying with an alkyl halide or an alkyl glycidyl ether and a sulfonate, with base catalysis, or by etherifying ethers from the group of hydroxyalkylcelluloses with an alkyl halide or an alkyl glycidyl ether and a sulfonate, with base catalysis, preferably A) by etherifying cellulose with ethylene oxide, propylene oxide and/or glycidyl alcohol and an alkyl halide or an alkylene oxide or an alkyl glycidyl ether and an alkenylsulfonate or chloroalkylsulfonate, with base catalysis, preferably in a suspension medium;

B) by etherifying hydroxyethylcellulose, hydroxypropylcellulose, dihydroxypropylcellulose or a cellulose ether having two or more of said hydroxyalkyl substituents with an alkyl halide or an alkylene oxide or an alkyl glycidyl ether and an alkenylsulfonate or chloroalkylsulfonate, with base catalysis, preferably in a suspension medium.

Suspension media preferably used are lower alcohols or ketones, an example being isopropanol, tert-butanol or acetone, in a weight ratio to the cellulose of from 3:1 to 30:1, preferably from 8:1 to 15:1. As the base it is usual to use aqueous solutions of alkali metal hydroxides, especially sodium hydroxide. The molar ratio of base to anhydroglucose unit is determined by the carbohydrate (derivative) used. When using cellulose (method A) the molar ratio is preferably from 1.0 to 1.5; for products which are already etherified (method B) it is preferably from 0.1 to 1.0 mol of base per anhydroglucose unit.

The water content of the reaction mixture is preferably from 5 to 30, in particular from 10 to 20, mol of water per anhydroglucose unit.

After the suspension medium has been introduced as initial charge, the cellulose added and the batch rendered alkaline with the aqueous base, the batch is homogenized thoroughly and stirred without supply of heat, with cooling if desired, for preferably from 0.5 to 2 hours. The etherification reagents (epoxyalkanes, alkyl glycidyl ethers and/or alkyl halides and sulfonic acid derivatives) are subsequently added in unison or in succession. The batch is then brought preferably to a temperature in the range from 60 to 120° C., with particular preference from 80 to 100° C., and is heated for preferably from 2 to 6 hours. After cooling, it is neutralized with an acid, preferably hydrochloric acid, nitric acid and/or acetic acid, preferably to a pH of from 6 to 8. The suspension medium is removed by decantation or filtration. The crude cellulose mixed ether can be freed from the adhering byproducts, such as polyglycols, glycol ethers and salts, by extraction with aqueous alcohols or ketones having a preferred water content of from 10 to 50% by weight, especially isopropanol, ethanol and acetone. After drying under reduced pressure or at atmospheric pressure at from 50 to 120° C., the desired cellulose mixed ether is obtained as a colorless or slightly yellowish powder.

If required, the degree of polymerization desired in accordance with the invention for the cellulose ether can be established prior to or during its preparation process by the addition of a peroxo compound, such as hydrogen peroxide, or a peroxodisulfate salt or other oxidizing agent, sodium chloride being one example. These methods of decreasing the molecular weight, and the respective industrial procedure, are prior art (T. M. Greenway in "Cellulosic Polymers, Blends and Composites", ed. R. D. Gilbert, Carl Hanser Verlag, Munich, 1994, p. 178 ff.).

Suitable reaction apparatus for preparing the cellulose ether derivatives of the invention comprises, for example, stirred vessels, mixers and kneading apparatus. In principle it is possible to use any reaction apparatus which is customary for the preparation of cellulose derivatives having non-hydrophobic substituents and which allows sufficiently thorough mixing of the cellulose or water-soluble cellulose ether with the nonhydrophobic reagents.

The invention additionally provides for the use of water-soluble ionic cellulose ethers from the group of hydroxy-alkylcelluloses which are substituted by on average from 0.001 to 1.0, preferably 0.001 to 0.2, alkyl group per anhydroglucose unit and carry from 0.01 to 0.4, preferably 0.01 to 0.15, particularly preferably 0.01 to 0.10 and particularly 0.01 to 0.09, sulfoalkyl group, preferably sulfoethyl group, per anhydroglucose unit, as protective colloids in connection with the preparation of aqueous polymer dispersions by means of free-radically initiated polymerization of ethylenically unsaturated monomers in aqueous emulsion, and provides an aqueous polymer dispersion prepared by free-radically initiated polymerization of ethylenically unsaturated monomers in aqueous emulsion in the presence of from 0.2 to 5.0% by weight, based on the total amount of the monomers used, of water-soluble ionic cellulose ethers from the group of hydroxyalkylcelluloses which are substituted by on average from 0.001 to 1.0 alkyl group per anhydroglucose unit and carry from 0.01 to 0.4 sulfoalkyl group per anhydroglucose unit.

The proportion of the cellulose ethers of the invention in connection with the preparation of such polymer dispersions is preferably from 0.2 to 5.0% by weight, and with particular preference from 0.3 to 1.0% by weight, based on the total amount of monomers used.

Suitable monomers are ethylenically unsaturated, free-radically polymerizable compounds which are themselves insoluble in water, examples being simple ethylenically unsaturated hydrocarbons having chain lengths of from 2 to 12 carbon atoms, preferably ethylene and propylene; esters having chain lengths of from 2 to 12 carbon atoms of acrylic, methacrylic, maleic, fumaric or itaconic acid, preferably ethyl, propyl and butyl esters; vinyl esters of unbranched and branched carboxylic acids having chain lengths of from 1 to 12 carbon atoms, especially vinyl acetate and Versatic acid vinyl esters; ethylenically unsaturated aromatic compounds, preferably styrene; ethylenically unsaturated aldehydes and ketones having 3 to 12 carbon atoms, preferably acrolein, methacrolein and methyl vinyl ketone, and halogenated ethylenically unsatured compounds, and example being vinyl chloride.

Particular preference is given to mixtures of the above-mentioned monomers in which at least one component is a vinyl ester, preferably vinyl acetate. It is also possible to use mixtures of one or more of the monomers mentioned with hydrophilic monomers, for example, acrylonitrile, acrylic acid, methacrylic acid, itaconic acid or mixtures thereof.

An aqueous polymerization recipe in which water-soluble ionic cellulose ethers from the group of the hydroxyalkylcelluloses which are substituted by on average from 0.001 to 1.0 alkyl group per anhydroglucose unit and carry from 0.01 to 0.4 sulfoalkyl group per anhydroglucose unit are used as protective colloids preferably contains from 10 to 70% by weight, preferably from 30 to 60% by weight, of the abovementioned monomers plus from 0 to 10% by weight of one or more emulsifiers. Free-radical initiators customarily used are diazo compounds, redox initiators, organic or inorganic peroxo compounds, in amounts of from 0.1 to 3% by weight, preferably from 0.5 to 1% by weight, based on the total amount of the monomers. Further auxiliaries, examples being buffer substances or preservatives, can be added.

All components can be included together in the initial charge at the beginning of the reaction. in which case the monomer or monomer mixture is emulsified by stirring or by means of other mixing equipment. The polymerization process is started by raising the temperature. The temperatures required are dependent on the initiator system used and are between 40 and 120° C. Following the onset of the reaction, cooling may also be necessary as a result of the exothermic nature of the reaction. The end of the reaction is discernible by abatement of the evolution of heat. In order to complete the reaction this is followed, optionally, by an after-reaction with external supply of heat. After cooling, auxiliaries for adjusting the pH, such as, for example, buffers, acids or bases, or for stabilization, such as preservatives, can be added. Optionally, the polymerization can also be started with a fraction, for example, from 10 to 20% by weight, of the amount of monomer and free-radical initiator, and further monomer and free-radical initiator can be added following the onset of the reaction, preferably in such a way that the desired polymerization temperature is controlled by means of the addition.

The dispersions obtained in accordance with the invention have the following characteristic properties:

Viscosity of the dispersions at low shear rate ($1.0\ s^{-1}$):

for good processability and dispersion stability a viscosity of between 10,000 and 30,000 mPa·s, in particular from 15,000 to 25,000, is preferably desirable.

Viscosity of the dispersions at a high shear rate ($\geq 250\ s^{-1}$):

for the dispersions to be readily conveyable, the viscosity at a high shear rate should preferably be <450 mPa·s ($250\ s^{-1}$), in particular from 200 to 420 mPa·s.

Average particle size of the dispersion:

The average particle size of the dispersion should preferably be from 200 to 300 nm (measured at a wavelength of 435 nm) in order to prevent unwanted settling of the dispersion (formation of serum).

Amounts of coagulum after filtration of the dispersion through a 100 $\mu$m and 40 $\mu$m sieve, expressed in mg per 1000 g of dispersion:

the dispersions have a coagulum content of <200 mg/kg of dispersion with 100 $\mu$m filtration and <300 mg/kg of dispersion with 40 $\mu$m filtration.

Water absorption of the dried polymer films:

The dispersion is poured onto a plate and dried to form a film. After treatment with water, the 1st water absorption (in % by weight of the weight of the polymer film itself) is determined via the weight increase. After drying again, the 2nd water absorption is determined. The 1st water absorption is generally greater than the 2nd water absorption, since the hydrophilic components (emulsifiers, protective colloid) are washed out during the 1st irrigation of the film. It should preferably be less than 25%, with particular preference between 5 and 20% by weight.

In addition to the performance parameters set out above, the grafting yield of the protective colloid used has an important part to play. A high grafting yield indicates high efficiency of the protective colloid. However, excessively high grafting yields lead to instances of crosslinking of the polymer particles, in conjunction with high coagulum contents and dilatent flow behavior of the dispersion, The grafting yield should preferably be between 15 and 30%, with particular preference between 20 and 25%.

The use of the hydrophobically modified, sulfoalkyl-containing hydroxyalkylcelluloses of the invention in connection with the preparation of vinyl dispersions has the advantage that the amount required is only half that of the conventional, commercial hydroxyethylcellulose, and that the dispersions which are prepared using the protective colloids employed in accordance with the invention are of superior quality. Dispersions which are prepared using alkyl-containing hydroxyethylcelluloses which are outside the degrees of substitution claimed are of significantly poorer quality (Comparative Examples).

The present invention is described in detail below by reference to working examples although without being restricted thereto.

EXAMPLES

The figures for the degrees of substitution are based on the molar degree of substitution (MS) in the case of hydroxyalkyl groups and on the degree of substitution (DS) in the case of the alkyl groups. In both cases, these figures indicate how high the degree of substitution of the respective group is per anhydroglucose unit. The pure active compound content is determined by subtracting the moisture content and the residual salt content of the product.

Preparation Examples

Example 1

The hydrophobic reagent used is a ($C_{15}$–$C_{17}$)-alkyl glycidyl ether from EMS-Chemie, Zurich (tradename Grilonit® RV 1814).

Finely ground pinewood pulp is suspended in virtually anhydrous isopropanol in a 2 l glass reactor with anchor stirrer. Following inertization (evacuation and flooding with nitrogen), 49.5% strength sodium hydroxide solution and water are run in with stirring at 25° C. The mixture is rendered alkaline at 25° C. for 60 minutes. Ethylene oxide is run in and the temperature is held at 40° C. for one hour and then at 80° C. for one hour. Then, at about 80° C., the desired amount of an alkyl glycidyl ether, dissolved in 20 g of isopropanol, is added and etherification is carried out at 80° C. for two hours. 28.3% strength aqueous sodium vinylsulfonate (NaVSO$_3$) solution is added and the mixture is reacted at 80° C. for two to three hours. After cooling to room temperature, it is neutralized with approximately 20% strength hydrochloric acid. The product is filtered off with suction, washed with 80% strength aqueous acetone to a salt content of <0.5%, and dried at 75° C.

The quantities used and the degrees of substitution of the hydrophobically modified hydroxyethylsulfoethylcelluloses obtained are set out in Table 1.

TABLE 1

| Example 1 | Amounts used (g) | | | | | | | Product yield g | Degrees of substitution | | |
|---|---|---|---|---|---|---|---|---|---|---|---|
| | Pulp | Isopropanol | H$_2$O | NaOH 49.5% | EO | Grilonit RV1814 | S*) | NaVSO$_3$ 28.3% | | MS HE | DS HM | DS SE |
| A | 75.0 | 593 | 103.6 | 40.0 | 90.0 | — | 20 | 41.0 | 121.1 | 2.46 | — | 0.07 |
| B | 75.0 | 593 | 103.6 | 40.0 | 90.0 | 6.4 | 20 | 41.0 | 123.1 | 2.49 | 0.006 | 0.07 |
| C | 75.0 | 593 | 103.6 | 40.0 | 90.0 | 12.8 | 20 | 41.0 | 121.2 | 2.42 | 0.007 | 0.07 |
| D | 75.0 | 593 | 103.6 | 40.0 | 90.0 | 19.2 | 20 | 41.0 | 121.8 | 2.53 | 0.011 | 0.08 |
| E | 75.0 | 593 | 103.6 | 40.0 | 90.0 | 25.6 | 20 | 41.0 | 119.9 | 2.49 | 0.012 | 0.08 |
| F | 85.0 | 672 | 117.4 | 45.3 | 102.0 | — | 22.7 | 46.5 | 140.1 | 2.38 | — | 0.07 |
| G | 85.0 | 672 | 117.4 | 45.3 | 102.0 | 7.3 | 22.7 | 46.5 | 136.5 | 2.33 | 0.003 | 0.07 |
| H | 85.0 | 672 | 117.4 | 45.3 | 102.0 | 14.5 | 22.7 | 46.5 | 138.8 | 2.32 | 0.005 | 0.07 |
| I | 85.0 | 672 | 117.4 | 45.3 | 102.0 | 21.8 | 22.7 | 46.5 | 137.3 | 2.39 | 0.007 | 0.07 |
| J | 85.0 | 672 | 117.4 | 45.3 | 102.0 | 29.0 | 22.7 | 46.5 | 139.4 | 2.31 | 0.010 | 0.08 |
| K | 75.0 | 593 | 103.6 | 40.0 | 90.0 | — | 20 | 62.0 | 124.3 | 2.35 | — | 0.10 |
| L | 75.0 | 593 | 103.6 | 40.0 | 90.0 | 6.4 | 20 | 62.0 | 124.5 | 2.42 | 0.006 | 0.10 |
| M | 75.0 | 593 | 103.6 | 40.0 | 90.0 | 12.8 | 20 | 62.0 | 122.3 | 2.34 | 0.007 | 0.08 |
| N | 75.0 | 593 | 103.6 | 40.0 | 90.0 | 19.2 | 20 | 62.0 | 119.5 | 2.36 | 0.010 | 0.09 |
| O | 75.0 | 593 | 103.6 | 40.0 | 90.0 | 25.6 | 20 | 62.0 | 119.6 | 2.47 | 0.012 | 0.09 |

*)S = solvent for reagent

Example 2

The procedure is as in Example 1 except that a larger molar amount of ethylene oxide is used.

The amounts used and the degrees of substitution of the hydrophobically modified hydroxyethylsulfoethylcelluloses obtained are set out in Table 2.

TABLE 2

| Example 2 | Amounts used (g) | | | | | | | Product yield g | Degrees of substitution | | |
|---|---|---|---|---|---|---|---|---|---|---|---|
| | Pulp | Isopropanol | H$_2$O | NaOH 49.5% | EO | Grilonit RV1814 | S*) | NaVSO$_3$ 28.3% | | MS HE | DS HM | DS SE |
| A | 75.0 | 593 | 103.6 | 40.0 | 138.4 | — | 20 | 62.0 | 142.2 | 3.59 | — | 0.04 |
| B | 75.0 | 593 | 103.6 | 40.0 | 138.4 | 6.4 | 20 | 62.0 | 142.5 | 3.61 | 0.010 | 0.04 |
| C | 75.0 | 593 | 103.6 | 40.0 | 138.4 | 12.8 | 20 | 62.0 | 140.8 | 3.62 | 0.016 | 0.06 |
| D | 75.0 | 593 | 103.6 | 40.0 | 138.4 | 19.2 | 20 | 62.0 | 143.1 | 3.67 | 0.021 | 0.04 |
| E | 75.0 | 593 | 103.6 | 40.0 | 138.4 | 25.6 | 20 | 62.0 | 149.2 | 3.59 | 0.027 | 0.03 |
| F | 75.0 | 593 | 103.6 | 40.0 | 138.4 | 38.4 | 20 | 62.0 | 145.7 | 3.80 | 0.044 | 0.03 |
| G | 75.0 | 593 | 103.6 | 40.0 | 138.4 | 64.0 | 20 | 62.0 | 143.6 | 3.75 | 0.055 | 0.04 |

*)S = solvent for reagent

Example 3

The procedure is as in Example 2 except that high molecular mass linters pulp is used. The amounts used and the degrees of substitution of the hydrophobically modified hydroxyethylsulfoethylcelluloses obtained are set out in Table 3.

TABLE 3

| Example 3 | Pulp | Isopropanol | H$_2$O | NaOH 49.5% | EO | Grilonit RV1814 | S*) | NaVSO$_3$ 28.3% | Product yield g | MS HE | DS HM | DS SE |
|---|---|---|---|---|---|---|---|---|---|---|---|---|
| | | | | Amounts used (g) | | | | | | | Degrees of substitution | |
| A | 75.0 | 593 | 103.6 | 40.0 | 138.4 | — | 20 | 62.0 | 151.9 | 3.00 | — | 0.04 |
| B | 75.0 | 593 | 103.6 | 40.0 | 138.4 | — | 20 | 62.0 | 149.0 | 3.54 | — | 0.09 |
| C | 75.0 | 593 | 103.6 | 40.0 | 138.4 | 6.4 | 20 | 62.0 | 148.6 | 3.64 | 0.009 | 0.09 |
| D | 75.0 | 593 | 103.6 | 40.0 | 138.4 | 12.8 | 20 | 62.0 | 149.3 | 3.56 | 0.013 | 0.09 |
| E | 75.0 | 593 | 103.6 | 40.0 | 138.4 | 19.2 | 20 | 62.0 | 146.0 | 3.54 | 0.020 | 0.08 |
| F | 75.0 | 593 | 103.6 | 40.0 | 138.4 | 25.6 | 20 | 62.0 | 147.6 | 3.41 | 0.022 | 0.07 |
| G | 75.0 | 593 | 103.6 | 40.0 | 138.4 | 38.4 | 20 | 62.0 | 147.6 | 3.31 | 0.036 | 0.07 |
| H | 75.0 | 593 | 103.6 | 40.0 | 138.4 | 64.0 | 20 | 62.0 | 150.6 | 3.35 | 0.051 | 0.07 |
| I | 85.0 | 672 | 117.4 | 45.3 | 156.9 | — | 22.7 | 22.7 | 160.0 | 3.18 | — | 0.03 |
| J | 85.0 | 672 | 117.4 | 45.3 | 156.9 | 7.3 | 22.7 | 22.7 | 163.5 | 3.04 | 0.011 | 0.02 |
| K | 85.0 | 672 | 117.4 | 45.3 | 156.9 | 14.5 | 22.7 | 22.7 | 164.1 | 3.32 | 0.016 | 0.01 |
| L | 85.0 | 672 | 117.4 | 45.3 | 156.9 | 21.8 | 22.7 | 22.7 | 157.4 | 3.31 | 0.020 | 0.01 |
| M | 85.0 | 672 | 117.4 | 45.3 | 156.9 | 29.0 | 22.7 | 22.7 | 160.7 | 3.41 | 0.027 | 0.02 |
| N | 85.0 | 672 | 117.4 | 45.3 | 156.9 | 43.5 | 22.7 | 22.7 | 166.0 | 3.36 | 0.037 | 0.02 |
| O | 85.0 | 672 | 117.4 | 45.3 | 156.9 | 72.5 | 22.7 | 22.7 | 166.7 | 3.44 | 0.063 | 0.01 |

*)S = solvent for reagent

Example 4

The procedure is as in Example 2. For oxidative adjustment to the molecular weight, etherification with the alkyl glycidyl ether is followed by addition of a small amount of 3% strength hydrogen peroxide solution, after which the temperature is held at 80° C. for 15 minutes. After that time, sodium vinylsulfonate is added.

The amounts used and the degrees of substitution of the hydrophobically modified hydroxyethylsulfoethylcelluloses obtained are set out in Table 4.

TABLE 4

| Example 4 | Pulp | Isopropanol | H$_2$O | NaOH 49.5% | EO | RV1814 | S*) | H$_2$O$_2$ 3% | NaVSO$_3$ 28.3% | Product yield g | MS HE | DS HM | DS SE |
|---|---|---|---|---|---|---|---|---|---|---|---|---|---|
| | | | | Amounts used (g) | | | | | | | | Degrees of substitution | |
| A | 85.0 | 672 | 112.0 | 45.3 | 156.9 | 21.8 | 22.7 | 5.5 | 70.3 | 156.6 | 3.21 | 0.027 | 0.05 |
| B | 85.0 | 672 | 114.6 | 45.3 | 156.9 | 21.8 | 22.7 | 2.8 | 70.3 | 160.2 | 3.62 | 0.023 | 0.07 |
| C | 85.0 | 672 | 116.0 | 45.3 | 156.9 | 21.8 | 22.7 | 1.4 | 70.3 | 160.0 | 3.65 | 0.021 | 0.08 |
| D | 85.0 | 672 | 112.0 | 45.3 | 156.9 | 29.0 | 22.7 | 5.5 | 70.3 | 156.7 | 3.54 | 0.024 | 0.06 |
| E | 85.0 | 672 | 114.6 | 45.3 | 156.9 | 29.0 | 22.7 | 2.8 | 70.3 | 161.0 | 3.54 | 0.028 | 0.08 |
| F | 85.0 | 672 | 116.0 | 45.3 | 156.9 | 29.0 | 22.7 | 1.4 | 70.3 | 162.0 | 3.59 | 0.025 | 0.08 |

*)S = solvent for reagent

Example 5

The procedure is as in Example 1. The hydrophobicizing reagent used is the glycidyl ether of a phenyl ethoxylate (5 ethylene oxide units) from Nagase Chemicals Ltd., Osaka (tradename Denacol® EX-145).

The amounts used and the degrees of substitution of the hydrophobically modified hydroxyethylsulfoethylcelluloses obtained are set out in Table 5.

TABLE 5

| Example 5 | Pulp | Isopropanol | H$_2$O | NaOH 49.5% | EO | Denacol EX-145 | S*) | NaVSO$_3$ 28.3% | Product yield g | MS HE | DS HM | DS SE |
|---|---|---|---|---|---|---|---|---|---|---|---|---|
| A | 85.0 | 672 | 117.4 | 45.3 | 118.7 | — | 22.7 | 70.3 | 146.5 | 2.78 | — | 0.09 |
| B | 85.0 | 672 | 117.4 | 45.3 | 118.7 | 9.4 | 22.7 | 70.3 | 148.6 | 2.86 | 0.008 | 0.10 |
| C | 85.0 | 672 | 117.4 | 45.3 | 118.7 | 18.9 | 22.7 | 70.3 | 151.7 | 2.95 | 0.016 | 0.10 |
| D | 85.0 | 672 | 117.4 | 45.3 | 118.7 | 28.3 | 22.7 | 70.3 | 147.5 | 2.97 | 0.027 | 0.09 |
| E | 85.0 | 672 | 117.4 | 45.3 | 118.7 | 37.8 | 22.7 | 70.3 | 147.2 | 3.02 | 0.033 | 0.09 |

*)S= solvent for reagent

Example 6

The procedure is as in Example 1. The hydrophobicizing reagent used is the glycidyl ether of a lauryl ethoxylate (C$_{12}$ alkyl with 15 ethylene oxide units) from Nagase Chemicals Ltd., Osaka (tradename Denacol® EX-171).

The amounts used and the degrees of substitution of the hydrophobically modified hydroxyethylsulfoethylcelluloses obtained are set out in Table 6.

TABLE 6

| Example 6 | Pulp | Isopropanol | H$_2$O | NaOH 49.5% | EO | Denacol EX-171 | S*) | NaVSO$_3$ 28.3% | Product yield g | MS HE | DS HM | DS SE |
|---|---|---|---|---|---|---|---|---|---|---|---|---|
| A | 85.0 | 672 | 117.4 | 45.3 | 118.7 | — | 22.7 | 70.3 | 146.5 | 2.78 | — | 0.09 |
| B | 85.0 | 672 | 117.4 | 45.3 | 118.7 | 23.0 | 22.7 | 70.3 | 146.5 | 2.82 | 0.006 | 0.09 |
| C | 85.0 | 672 | 117.4 | 45.3 | 118.7 | 23.0 | 22.7 | 70.3 | 147.2 | 2.69 | 0.006 | 0.10 |
| D | 85.0 | 672 | 117.4 | 45.3 | 118.7 | 46.1 | 22.7 | 70.3 | 148.1 | 2.83 | 0.010 | 0.11 |
| E | 85.0 | 672 | 117.4 | 45.3 | 118.7 | 46.1 | 22.7 | 70.3 | 150.3 | 2.89 | 0.009 | 0.10 |
| F | 85.0 | 672 | 117.4 | 45.3 | 118.7 | 69.1 | 22.7 | 70.3 | 151.9 | 2.92 | 0.012 | 0.10 |
| G | 85.0 | 672 | 117.4 | 45.3 | 118.7 | 92.1 | 22.7 | 70.3 | 150.7 | 3.09 | 0.017 | 0.11 |

*)S = solvent for reagent

Example 7

The procedure is as in Example 1. The suspension medium and solvent used is a mixture of tert-butanol and isopropanol.

The amounts used and the degrees of substitution of the hydrophobically modified hydroxyethylsulfoethylcelluloses obtained are set out in Table 7.

TABLE 7

| Example 7 | Pulp | t-BuOH +IPA | H$_2$O | NaOH 49.5% | EO | Grilonit RV1814 | S*) | NaVSO$_3$ 28.3% | Product yield g | MS HE | DS HM | DS SE |
|---|---|---|---|---|---|---|---|---|---|---|---|---|
| A | 85.0 | 672 | 117.4 | 45.3 | 119.0 | 21.8 | 22.7 | 70.3 | 146.2 | 3.24 | 0.021 | 0.09 |
| B | 85.0 | 672 | 117.4 | 45.3 | 112.1 | 21.8 | 22.7 | 70.3 | 177.2 | 3.28 | 0.021 | 0.11 |
| C | 85.0 | 672 | 117.4 | 45.3 | 119.0 | 21.8 | 22.7 | 46.9 | 169.4 | 3.50 | 0.026 | 0.08 |

*)S = solvent for reagent

Example 8 (Comparative)

Preparation of a vinyl ester polymer dispersion using hydroxyethylcellulose.

The monomer mixture used consists of 25% of ®Veova 10 (vinyl ester of $_\alpha$-branched C$_{10}$ carboxylic acids, shell) and 75% of vinyl acetate. 423.09 g of deionized water are placed in a 2-liter reactor having a ground flange and lid, and 14 g of hydroxyethylcellulose (®Tylose H 20, corresponding to 1.06% based on the finished polymer dispersion) are added with stirring at room temperature and dissolved. The following are then added in the given order:

3.60 g of borax
11.50 g of ®Emulsogen EPA 073
20.00 g of ®Emulsogen EPA 287
0.70 g of potassium peroxodisulfate
1.40 g of acetic acid (99–100%)
59.40 g of initiator solution (1.17% strength potassium peroxodisulfate solution)
70.00 g of monomer mixture.

The emulsion is heated to a temperature of 74 to 77° C. over a period of 30 minutes and this temperature is held for 15 minutes. 630.0 g of monomer mixture are then added at a metering rate of 4.49 ml/min and 85.61 of initiator solution (1.17% strength) are added at a metering rate of 0.51 ml/min from two separate Dosimats. A polymerization temperature of 80° C. is established. 630 g of monomer mixture are added over a period of 2 hours 40 minutes, and the initiator solution over 2 hours 50 minutes.

When addition of the chemicals is complete, the reaction temperature of 80° C. is maintained for 2 hours. Thereafter, the dispersion is cooled and 2 g of ®Mergal K 9 N (Riedel de Haën) are added at 40° C. as preservative. The physical properties of the polymer dispersions are collated in Tables 8 and 9.

Assessment: The viscosity of the dispersion at a low shear rate is 11,700 mPa·s and is thus at the lower tolerable limit The coagulum content (40 μm sieve) is very high (Table 9).

Example 9 (Comparative)

The procedure of Example 8 is repeated. Instead of 14 g of ®Tylose H 20, only 7.0 g are used.

The viscosity of the dispersion is much too low.

Example 10 (Comparative)

The procedure of Example 8 is repeated. Instead of 14 g of ®Tylose H 20 (viscosity stage 20 mPa·s at 2%), 14 g of ®Tylose H 200 (viscosity stage 200 mPa·s at 2%) are used.

In general terms, the dispersion can be assessed as being suitable for use; however, at high shear rates, the viscosity is at the upper limit of the desired range (Table 8).

Example 11 (Comparative)

The procedure of Example 8 is repeated. Instead of 14 g of ®Tylose H 20 (viscosity stage 20 mPa·s at 2%), 7.0 g of ®Tylose H 200 (viscosity stage 200 mPa·s at 2%) are used.

The viscosity of the dispersion at low shear rates is too low, the particle size too high (Tables 8 and 9).

Example 12 (Comparative)

The procedure of Example 8 is repeated. Instead of 14 g of ®Tylose H 20, 7 g of a hydroxyethyl-sulfoethylcellulose (HESEC) having a DS (SE) of 0.007 are used. The polymer dispersion gives satisfactory results (Tables 8 and 9) in all performance tests with the exception of the rheological properties, with an amount of cellulose ether reduced by half relative to Comparative Example 8.

Example 13

The procedure of Example 8 is repeated. Instead of 14 g of ®Tylose H 20, 7.0 g of a hydrophobically modified hydroxyethyl-sulfoethylcellulose (HM-HESEC) having a DS (HM) of 0.006 and a DS (SE) of 0.07 are used. The polymer dispersion gives satisfactory results (Tables 8 and 9) in all performance tests with the exception of the rheological properties, with an amount of cellulose ether reduced by half relative to Comparative Example 8.

Example 14

The procedure of Example 8 is repeated. Instead of 14 g of ®Tylose H 20, 7.0 g of an HM-HESEC having a DS (HM) of 0.007 and a DS (SE) of 0.07 are used. The rheology of the dispersion can be assessed as good (Table 8). The water absorption of the polymer films is regarded as favorable. The amount of cellulose ether used is reduced by half relative to Comparative Example 8.

Example 15

The procedure of Example 8 is repeated. Instead of 14 g of ®Tylose H 20, 7.0 g of an HM-HESEC having a DS (HM) of 0.011 and a DS (SE) of 0.08 are used. The polymer dispersion gives satisfactory results (Tables 8 and 9) in all performance and rheological tests, with an amount of cellulose ether reduced by half relative to Comparative Example 8.

Example 16 (Comparative)

The procedure of Example 8 is repeated. Instead of 14 g of ®Tylose H 20, 7.0 g of an HESEC having a DS (SE) of 0.1 are used.

The polymer dispersion shows excessive water values (Table 9) with an amount of cellulose ether reduced by half relative to Comparative Example 8.

Example 17

The procedure of Example 8 is repeated. Instead of 14 g of ®Tylose H 20, 7.0 g of an HM-HESEC having a DS (HM) of 0.006 and a DS (SE) of 0.1 are used.

The polymer dispersion gives favorable results in all parameters.

Example 18

The procedure of Example 8 is repeated. Instead of 14 g of ®Tylose H 20, 7.0 g of an HM-HESEC having a DS (HM) of 0.007 and a DS (SE) of 0.08 are used.

The polymer dispersion gives very good results (Tables 8 and 9) in all performance and rheological tests, with an amount of cellulose ether reduced by half relative to Comparative Example 8.

Example 19

The procedure of Example 8 is repeated. Instead of 14 g of ®Tylose H 20, 7.0 g of an HM-HESEC having a DS (HM) of 0.01 and a DS (SE) of 0.09 are used. The polymer dispersion gives good results (Tables 8 and 9) in all performance and rheological tests properties, with an amount of cellulose ether reduced by half relative to Comparative Example 8.

TABLE 8

Viscosity profiles of the products from the examples:
HM-HESEC-containing polymer dispersions based on vinyl acetate/VeoVa 10

| Example No. | Cellulose ether | Amount used (%) | DS (HM) | DS (SE) | Viscosity (mPas) at shear rate of | | | | | | |
|---|---|---|---|---|---|---|---|---|---|---|---|
| | | | | | 1.00 (1/s) | 2.50 (1/s) | 6.30 (1/s) | 16.0 (1/s) | 40.0 (1/s) | 100 (1/s) | 250 (1/s) |
| 8 | H 20 | 1.06 | 0 | 0 | 11,700 | 5740 | 2360 | 1380 | 730 | 433 | 270 |
| 9 | H 20 | 0.53 | 0 | 0 | 876 | 496 | 323 | 218 | 148 | 109 | 75 |
| 10 | H 200 | 1.06 | 0 | 0 | 24,600 | 10,300 | 4520 | 2250 | 1170 | 653 | 399 |
| 11 | H 200 | 0.53 | 0 | 0 | 1790 | 1040 | 624 | 380 | 232 | 154 | 104 |
| 12 | HESEC | 0.53 | 0 | 0.07 | 4910 | 2500 | 1290 | 696 | 359 | 227 | 143 |
| 13 | HM-HESEC | 0.53 | 0.006 | 0.07 | 3990 | 2100 | 1090 | 614 | 340 | 214 | 139 |
| 14 | HM-HESEC | 0.53 | 0.007 | 0.07 | 11,300 | 5050 | 2360 | 1200 | 623 | 360 | 221 |
| 15 | HM-HESEC | 0.53 | 0.011 | 0.08 | 22,200 | 9500 | 4270 | 2100 | 1050 | 583 | 341 |
| 16 | HESEC | 0.53 | 0 | 0.1 | 11,000 | 4790 | 2210 | 1150 | 626 | 375 | 235 |
| 17 | HM-HESEC | 0.53 | 0.006 | 0.1 | 18,700 | 7700 | 3400 | 1660 | 858 | 489 | 293 |
| 18 | HM-HESEC | 0.53 | 0.007 | 0.08 | 20,300 | 6980 | 4080 | 2010 | 1020 | 574 | 335 |
| 19 | HM-HESEC | 0.53 | 0.01 | 0.09 | 13,700 | 6220 | 2880 | 1470 | 781 | 460 | 218 |

TABLE 9

Particle sizes, coagulum contents, water absorption and degrees of grafting for the products of the examples

| Example No. | Cellulose ether | Amount used [%] | DS (HM) | DS (SE) | Particle size measured at | | Amount of coagulum in 1000 g of dispersion above | | Water absorption | | Grafted HEC |
|---|---|---|---|---|---|---|---|---|---|---|---|
| | | | | | 435 nm [nm] | 588 nm [nm] | 100 μm [mg] | 40 μm [mg] | 1st absorption [%] | 2nd absorption [%] | (% of amount used) (1/s) |
| 8 | H 20 | 1.06 | 0 | 0 | 235 | 255 | 262 | >1000 | 15.7 | 9.7 | <5 |
| 9 | H 20 | 0.53 | 0 | 0 | 318 | 406 | 361 | 418 | 18.8 | 12.7 | <5 |
| 10 | H 200 | 1.06 | 0 | 0 | 257 | 321 | 100 | 100 | 17.7 | 13.5 | 17.2 |
| 11 | H 200 | 0.53 | 0 | 0 | 397 | 475 | 158 | 196 | 14.6 | 10.3 | 12.4 |
| 12 | HESEC | 0.53 | 0 | 0.07 | 275 | 311 | 268 | 311 | 15.8 | 9.7 | 11.2 |
| 13 | HM-HESEC | 0.53 | 0.006 | 0.07 | 329 | 380 | 228 | 229 | 16.4 | 10.5 | 29.6 |
| 14 | HM-HESEC | 0.53 | 0.007 | 0.07 | 307 | 341 | 150 | 324 | 17.1 | 10.4 | 18.4 |
| 15 | HM-HESEC | 0.53 | 0.011 | 0.08 | 251 | 265 | 213 | 589 | 18.1 | 10.4 | 24.4 |
| 16 | HESEC | 0.53 | 0 | 0.1 | 271 | 298 | 313 | 464 | 25.5 | 7.4 | 12.8 |
| 17 | HM-HESEC | 0.53 | 0.006 | 0.1 | 261 | 276 | 88 | 473 | 20 | 7.1 | 20.3 |
| 18 | HM-HESEC | 0.53 | 0.007 | 0.08 | 263 | 281 | 133 | 346 | 17.3 | 6.6 | 20.7 |
| 19 | HM-HESEC | 0.53 | 0.01 | 0.09 | 306 | 336 | 168 | 152 | 15.5 | 12.4 | 17 |

What is claimed is:

1. An aqueous polymer dispersion, prepared by radically initiated polymerization of ethylenically unsaturated monomers in aqueous emulsion in the presence of from 0.2 to 5.0% by weight, based on the total amount of the monomers employed, of water-soluble ionic cellulose ethers from the group of hydroxyalkylcelluloses with more than 2.3 hydroxyalkyl groups per anhydroglucose unit, which are substituted by on average from 0.001 to 1.0 $C_{4-20}$ alkyl group per anhydroglucose unit, and which carry from 0.01 to 0.4 sulfoalkyl group per anhydroglucose unit.

2. A method of using a water soluble ionic cellulose ether comprising the steps of: providing a water soluble ionic cellulose ether from the group of hydroxyalkylcelluloses with more than 2.3 hydroxyalkyl groups per anhydroglucose unit, which is substituted by on average from 0.001 to 1.0 $C_{4-20}$ alkyl group per anhydroglucose unit, and which carries from 0.01 to 0.4 sulfoalkyl group per anhydroglucose unit as a protective colloid and adding said water soluble ionic cellulose ether to an aqueous polymer dispersion.

* * * * *